US012358107B2

(12) United States Patent
Neto et al.

(10) Patent No.: US 12,358,107 B2
(45) Date of Patent: Jul. 15, 2025

(54) HUB REMOVER TOOL

(71) Applicant: Lisle Corporation, Clarinda, IA (US)

(72) Inventors: Luiz Correa Neto, Framingham, MA (US); Dave Cabeen, New Market, IA (US)

(73) Assignee: Lisle Corporation, Clarinda, IA (US)

( * ) Notice: Subject to any disclaimer, the term of this patent is extended or adjusted under 35 U.S.C. 154(b) by 287 days.

(21) Appl. No.: 18/179,288

(22) Filed: Mar. 6, 2023

(65) Prior Publication Data

US 2023/0202008 A1 Jun. 29, 2023

Related U.S. Application Data

(60) Provisional application No. 63/317,604, filed on Mar. 8, 2022.

(51) Int. Cl.
*B25B 27/00* (2006.01)
*B25B 27/02* (2006.01)

(52) U.S. Cl.
CPC ........ *B25B 27/0035* (2013.01); *B25B 27/023* (2013.01)

(58) Field of Classification Search
CPC ... B25B 27/0035; B25B 27/023; B25B 27/00; B25B 27/16
See application file for complete search history.

(56) References Cited

U.S. PATENT DOCUMENTS

2002/0092385 A1* 7/2002 Belcher .................... B25B 13/48 81/176.1
2009/0300896 A1* 12/2009 Ozzimo .................. B25B 27/16 29/267

OTHER PUBLICATIONS

LTI Tools, YouTube, "LT830A—Universal Hub Shocker" visited on Mar. 6, 2023 at https://www.youtube.com/watch?v=c_OAnFkK1ml&t=16s.
LTI Tools, YouTube, "LT830—Hub Shocker Quick Tool Review—It Works," visited on Mar. 6, 2023 at https://www.ltitools.com/products/lt830a/.
LTI Tools, "LT830A—Universal Hub Shocker," visited on Mar. 6, 2023 at https://www.ltitools.com/products/lt830a/.

* cited by examiner

*Primary Examiner* — Jason L Vaughan
*Assistant Examiner* — Amanda Kreiling
(74) *Attorney, Agent, or Firm* — Banner & Witcoff, Ltd.

(57) ABSTRACT

A tool for removing a hub assembly from a suspension arm of a vehicle may include a hub remover plate, an insert, and a pusher screw assembly. The hub remover plate may comprise a front surface, a rear surface opposite the front surface, an arcuate section extending between the front surface and the rear surface. The hub remover plate may also include a slot and an opening that extending through the hub remover plate. An insert may comprise a first portion that is configured to be received within the opening of the hub remover plate, a second portion that includes a shoulder that is configured to contact the rear surface of the hub remover plate, and a threaded axial bore extending through the insert. The pusher screw assembly may include a screw, where the screw is configured to be received in the threaded axial bore of the insert.

20 Claims, 5 Drawing Sheets

HUB REMOVER TOOL

CROSS-REFERENCE TO RELATED APPLICATIONS

This application claims priority to and benefit of U.S. Provisional Application No. 63/317,604 titled “Hub Remover Tool” filed on Mar. 8, 2022, which is incorporated herein by reference in its entirety.

TECHNICAL FIELD

This disclosure relates to an automotive tool for use in the removal of a hub and bearing assembly from a suspension arm of a vehicle.

BACKGROUND

The hub assembly and the suspension arms of a vehicle are often made of dissimilar metals that can corrode and seize the hub assembly to the suspension arm making it difficult to separate from each other.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects of this disclosure may relate to a tool for removing a hub assembly from a suspension arm of a vehicle that comprises: (a) a hub remover plate that includes a front surface, a rear surface opposite the front surface, an arcuate section extending between the front surface and the rear surface, where the hub remover plate further comprises a slot and an opening extending through the hub remover plate; (b) an insert that includes a first portion that is configured to be received within the opening of the hub remover plate, a second portion that has a width greater than a shortest dimension of the opening to prevent the insert from passing through the opening during use of the tool, and a threaded axial bore extending through the insert; and (c) a pusher screw assembly that includes a screw, where the screw is configured to be received in the threaded axial bore of the insert. In some examples, the slot of the hub remover plate may comprise two slots, where the two slots have a common centerline. The slot may have a width and a length, and where the width is approximately 30 percent of the length. The opening of the hub remover plate may be generally rectangular in shape. A centerline of the opening may be aligned with the center of a radius of the arcuate section. The pusher screw assembly may further include a ball bearing pivot and a pusher pin, where the ball bearing pivot is received within an axial bore at a first end of the screw. The screw may also include a hexagonal shaped head at a second end of the screw opposite the first end. The pusher pin may include a first section that is at least partially received within the axial bore at the first end of the screw. A first end of the first section of the pusher pin may include a concave surface, where the concave surface has the same radius of the ball bearing pivot. The pusher pin may include a second section opposite the first end that includes a second end face with a planar surface.

Other aspects of this disclosure may relate to a method of removing a hub assembly from a suspension arm of a vehicle comprising: (a) attaching a hub remover plate to the hub assembly by positioning a first lug of the hub assembly through a first slot in the hub remover plate; (b) attaching a first nut onto the first lug to hold the hub remover plate to the hub assembly; (c) rotating the hub assembly to align an opening of the hub remover plate with a fixed member of the suspension arm; (d) inserting a first portion of an insert into the opening; (e) aligning a threaded axial bore of the insert with position a second portion of the insert with the fixed member of the suspension arm; (f) coupling a screw assembly to the threaded axial bore of the insert by placing a threaded shaft section of the screw assembly into the axial threaded bore such that the screw assembly is in contact the fixed member of the suspension arm; and (g) attaching a drive tool to the screw assembly to rotate the screw assembly. The screw assembly may comprise a screw, a ball bearing pivot, and a pusher pin, where the ball bearing pivot is received within an axial bore at a first end of the screw. The screw may further include a hexagonal shaped head at a second end of the screw opposite the first end, and wherein the pusher pin includes a first section that is at least partially received within the axial bore at the first end of the screw. A first end of the first section of the pusher pin may include a concave surface, where the concave surface has the same radius of the ball bearing pivot. The pusher pin may include a second section opposite the first end that includes a second end face with a planar surface. The method may further comprise positioning a second lug of the hub assembly through a second slot in the hub remover plate; and attaching a second nut onto a second lug.

Still other aspects of this disclosure may relate to a tool for removing a hub assembly from a suspension arm of a vehicle comprising: (a) a hub remover plate that includes a front surface, a rear surface opposite the front surface, an arcuate section extending between the front surface and the rear surface, where the hub remover plate further comprises a first elongated slot, a second elongated slot, and an opening that extend through the hub remover plate; where the first elongated slot and the second elongated slot are aligned on the same centerline; (b) an insert comprising a first portion that is configured to be received within the opening of the hub remover plate, a second portion that has a width greater than a shortest dimension of the opening to prevent the insert from passing through the opening during use of the tool, and a threaded axial bore extending through the insert; and (c) a pusher screw assembly that includes a screw, where the screw is configured to be received in the threaded axial bore of the insert. The opening of the hub remover plate may be generally rectangular in shape. A centerline of the opening may be aligned with the center of a radius of the arcuate section. The pusher screw assembly further may include a ball bearing pivot and a pusher pin, wherein the ball bearing pivot is received within an axial bore at a first end of the screw.

DESCRIPTION OF THE DRAWINGS

To allow for a fuller understanding of the present disclosure, it will now be described by way of example, with reference to the accompanying images and drawings in which.

DETAILED DESCRIPTION

Figure 1:
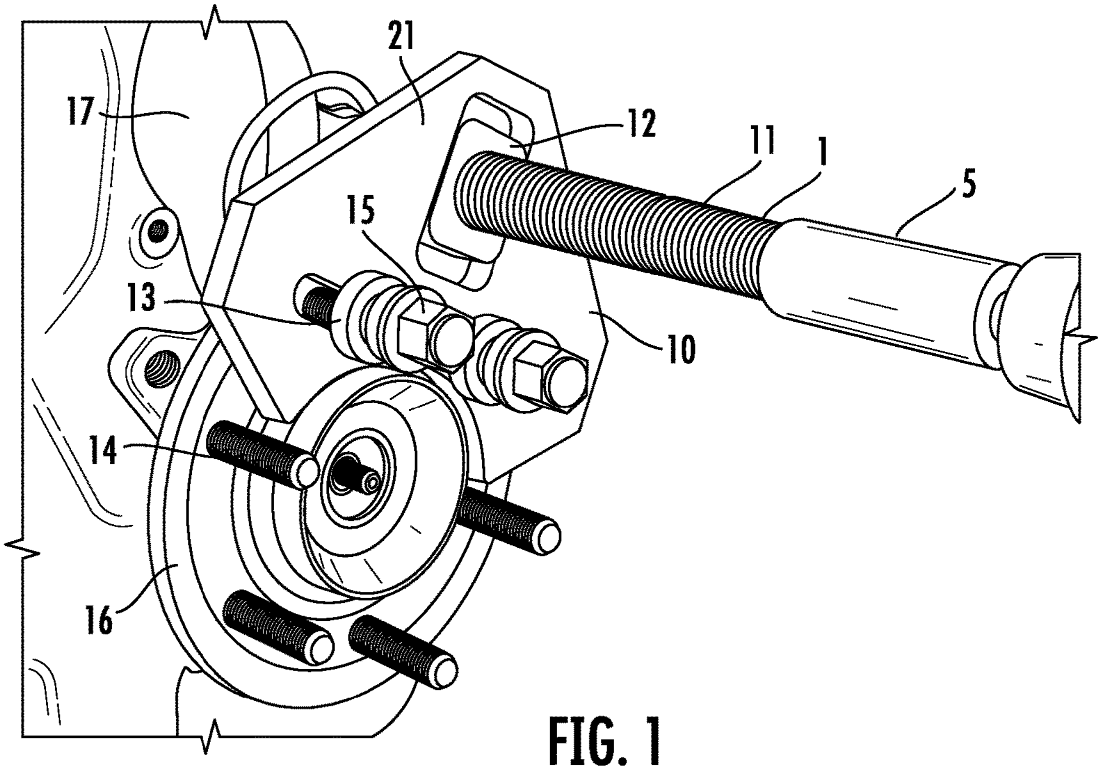
FIG. 1 illustrates a perspective view of the hub remover tool being used to remove a hub and bearing assembly, in accordance with aspects of this disclosure.
Figure 2:
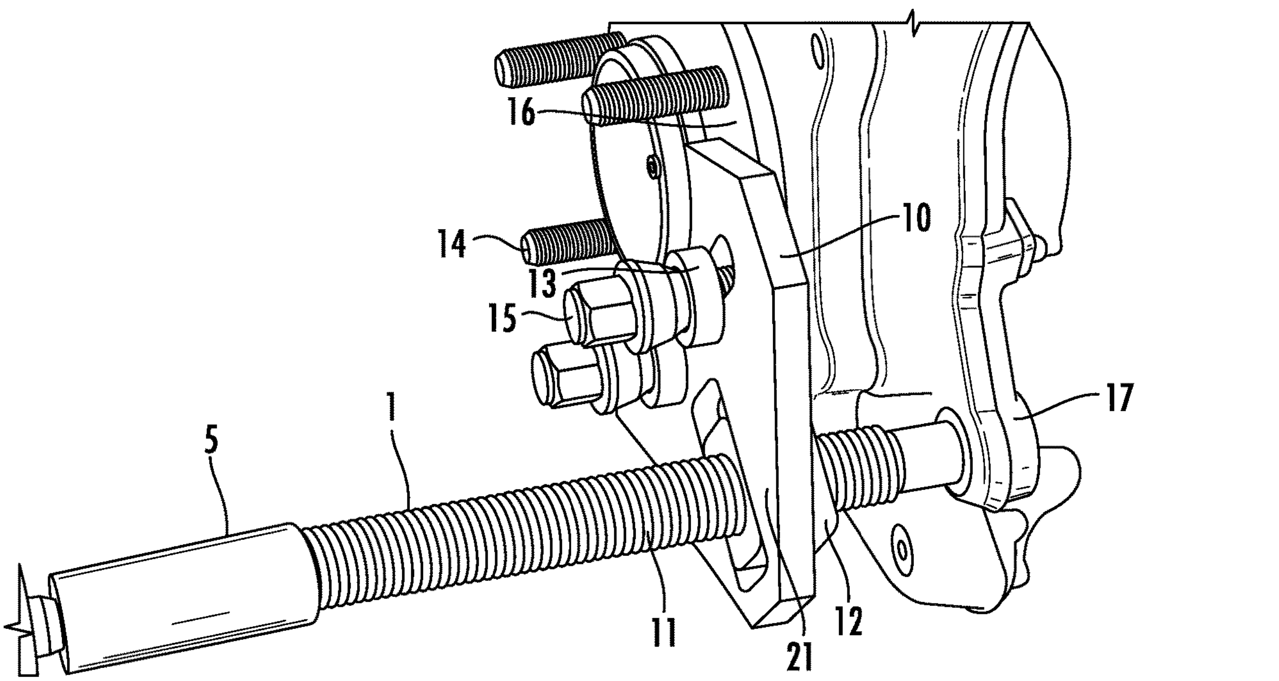
FIG. 2 illustrates a perspective view of the hub remover tool of FIG. 1 being used to remove a hub and bearing assembly, in accordance with aspects of this disclosure.
Figure 3:
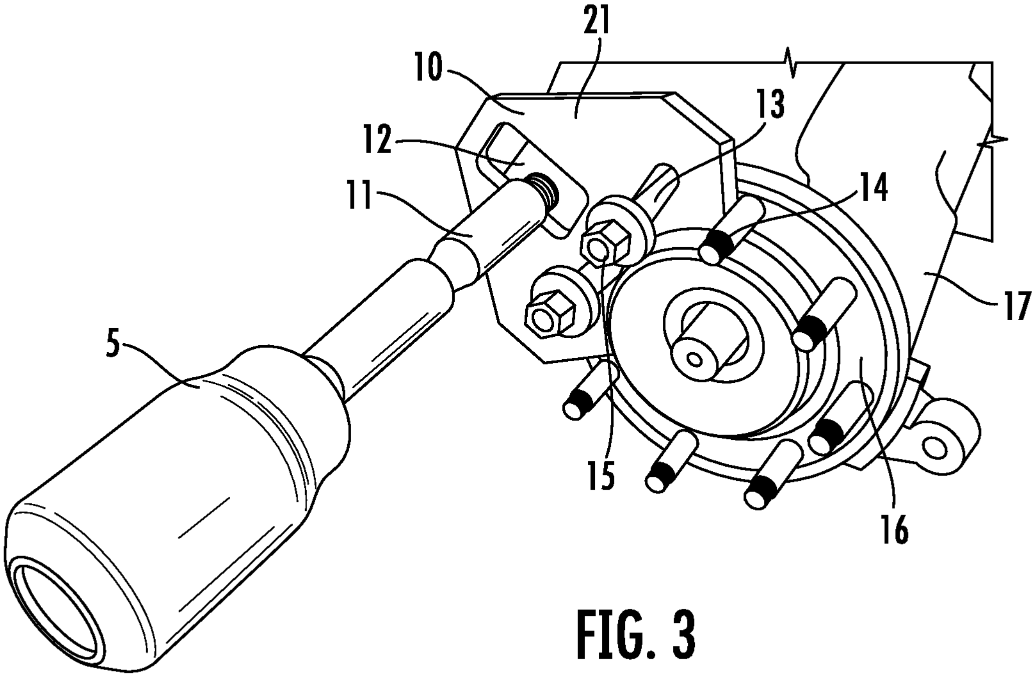
FIG. 3 illustrates a perspective view of a drive tool connected to the hub remover tool of FIG. 1 being used to remove a hub and bearing assembly, in accordance with aspects of this disclosure.

While this invention is susceptible of embodiments in many different forms, there are shown in the drawings and will herein be described in detail example embodiments of the invention with the understanding that the present disclosure is to be considered as an exemplification of the principles of the invention and is not intended to limit the broad aspect of the invention to the embodiments illustrated. In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention.

Also, while the terms "front," "rear," and the like may be used in this specification to describe various example features and elements of the invention, these terms are used herein as a matter of convenience, e.g., based on the example orientations shown in the figures or the orientation during typical use. Nothing in this specification should be construed as requiring a specific three-dimensional orientation of structures in order to fall within the scope of this invention. Also, the reader is advised that the attached drawings are not necessarily drawn to scale.

In general, this disclosure relates to a tool used for removal of hub and bearing assemblies from a vehicle suspension arm. The hub assembly and the suspension arms are often made of dissimilar metals that can corrode and seize the hub assembly to the suspension arm making it difficult to separate.

Referring to FIGS. 1-5B, the hub remover tool 1 may include a hub remover plate 10, a pusher screw assembly 11, a threaded insert 12, and washers 13.

Figure 4:
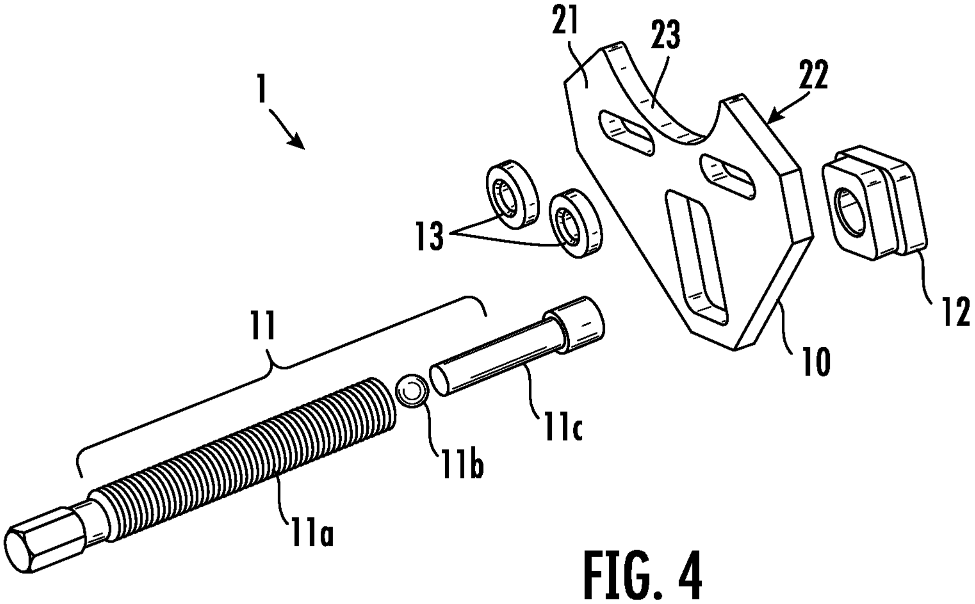
FIG. 4 is an exploded perspective view of the hub remover tool of FIG. 1, in accordance with aspects of this disclosure.
Figure 5A:
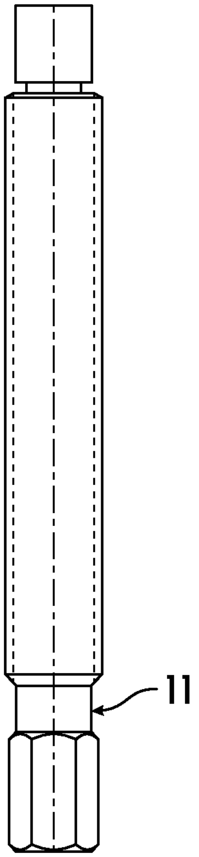
FIGS. 5A-5B illustrate front views of the components of the hub remover tool of FIG. 1, in accordance with aspects of this disclosure.
Figure 5B:
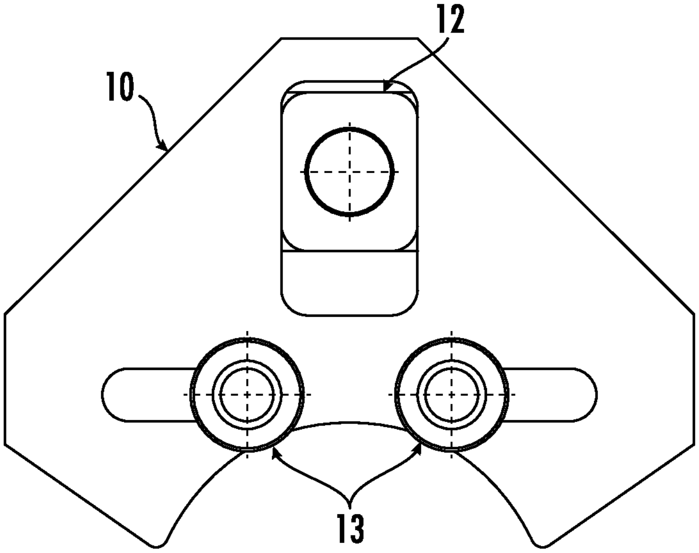
Figure 6A:
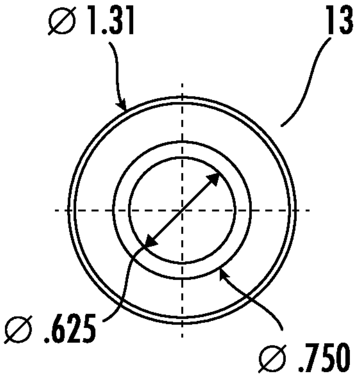
FIGS. 6A-6B illustrate views of a washer of the hub remover tool of FIG. 1, in accordance with aspects of this disclosure.
Figure 6B:
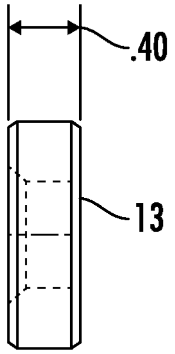
Figure 9:
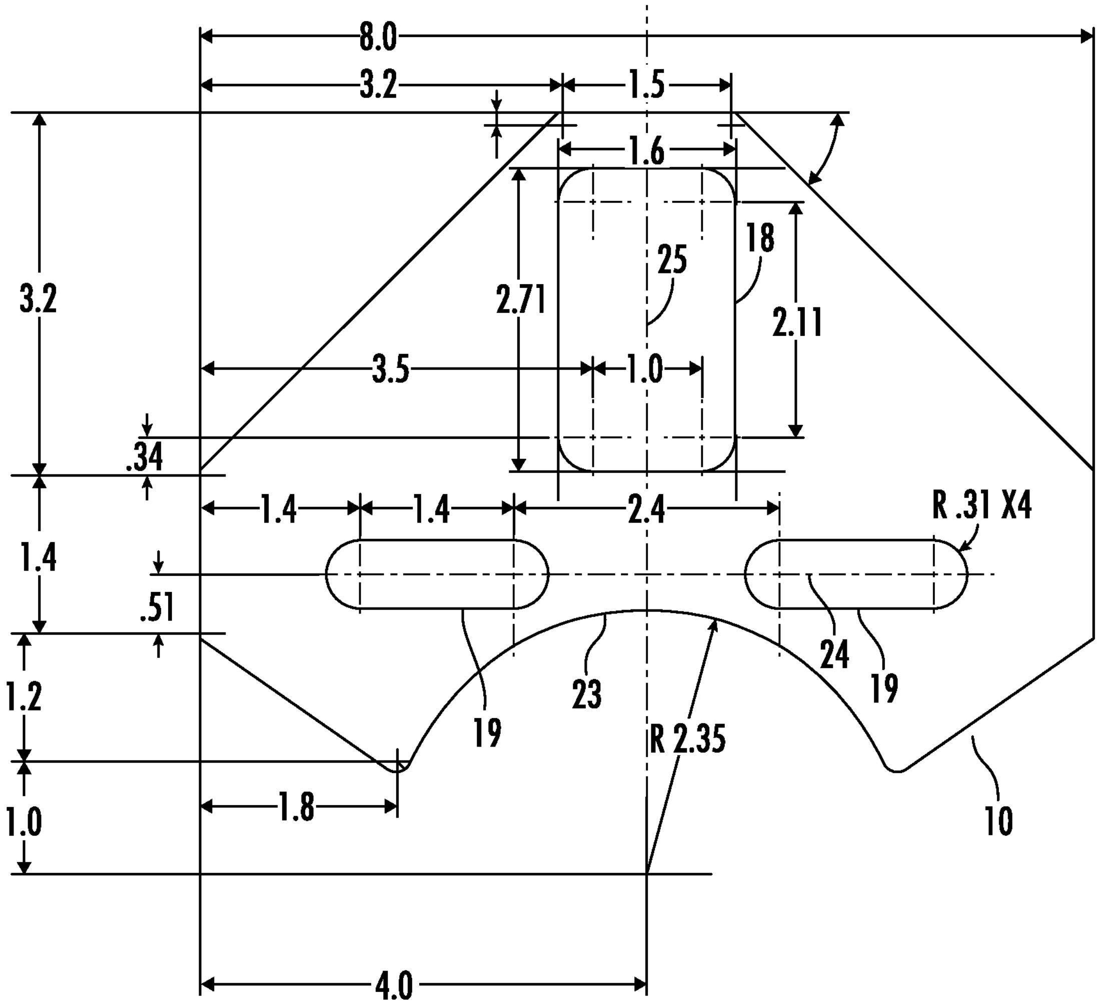
FIG. 9 illustrates a front view of a hub remover plate of the hub remover tool of FIG. 1, in accordance with aspects of this disclosure.

As shown in FIGS. 4 and 9, hub remover plate 10 preferably includes a front surface 21, a rear surface 22 opposite the front surface, and an arcuate section 23 extending between the front surface and the rear surface. The arcuate section 23 may be sized and configured for placement next to a hub assembly 16 that is mounted to a suspension arm 17. Hub remover plate 10 may also include at least one elongated slot 19 which defines an opening extending through the plate 10. Slot 19 is sized and configured to accept threaded lugs 14 attached to hub assembly 16. Hub remover plate slot 19 allows fitment to various hub assembly 16 configurations. In a preferred embodiment, the hub remover plate 10 may include two elongated slots 19. The two elongated slots 19 may be aligned on a common centerline 24. Each slot 19 may have a width and a length, where the width may be approximately 30 percent of the length. Although the preferred embodiment of the tool includes two slots 19, hub remover plate 10 may have additional elongated slot openings. Hub remover plate 10 also preferably includes a generally rectangular-shaped opening 18 spaced apart from slot 19. Opening 18 is sized and configured to receive a threaded insert 12. Although opening 18 is preferably general rectangular in shape, an opening of another shape may be used without departing from the scope of the invention. In addition, hub remover plate 10 may be symmetrical about a centerline 25 that extends from a center of a radius that forms the arcuate section 23. The opening 18 may be aligned with centerline 25.

Figure 8A:
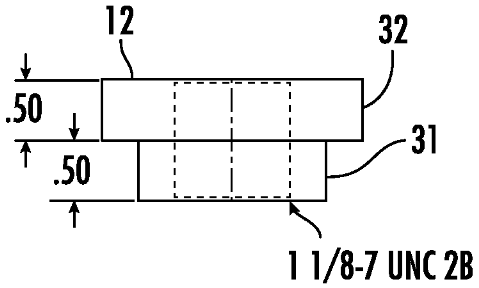
FIGS. 8A-8B illustrate views of an insert of the hub remover tool of FIG. 1, in accordance with aspects of this disclosure.
Figure 8B:
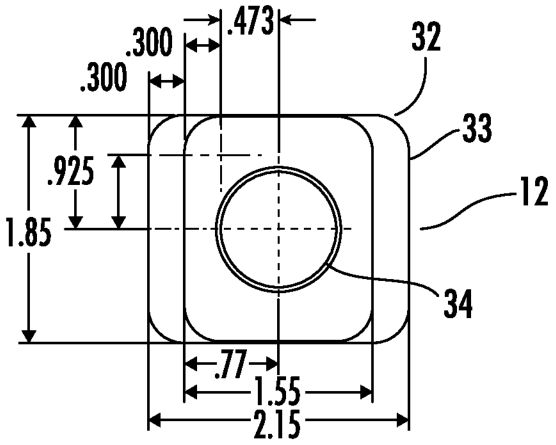

As best shown in FIGS. 8A-8B, the threaded insert 12 may comprise a first portion 31 that configured to be received within the opening 18 of the hub remover plate 10, a second portion 32 that includes a shoulder 33 that is configured to confront the rear surface 22 of the hub remover plate 10, and a threaded axial bore 34 extending through the insert 12. Insert 12 may preferably have a square shape with radiused corners and a T-shaped profile. Insert 12 preferably has a threaded axial bore 34 for accepting pusher screw assembly 11. Insert 12 preferably includes a first portion 31 having a width sized and configured to fit within opening 18. Insert 12 preferably includes a second portion 32 have a width greater than the first portion 31 to form shoulder 33. The width of the second portion 32 has a width greater than the shortest dimension of opening 18 which prevents insert 12 from passing completely through opening 18 during use of the hub remover tool 1. The insert 12 may also slide along opening 18 of the hub remover plate 10 to allow the pusher screw assembly 11 to better align with a surface on the suspension arm 17. Although insert 12 has been described as preferably a square shape with radiused corners, the insert may have other shapes and configuration that allows the insert 12 to fit within opening 18 during use of the tool 1. For example, opening 18 and insert 12 may be circular in shape without departing from the invention.

Figure 7A:
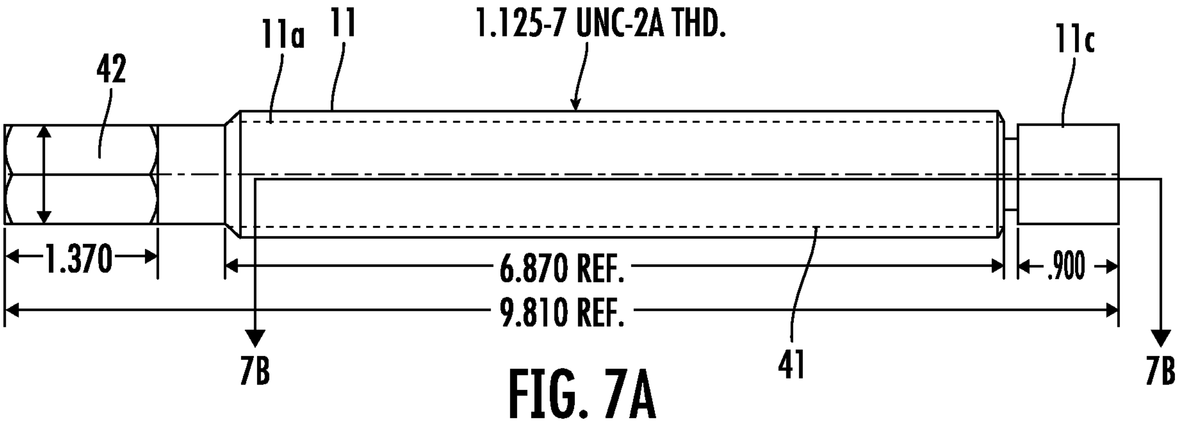
FIG. 7A illustrates a front view of a screw assembly of the hub remover tool of FIG. 1, in accordance with aspects of this disclosure.
Figure 7B:
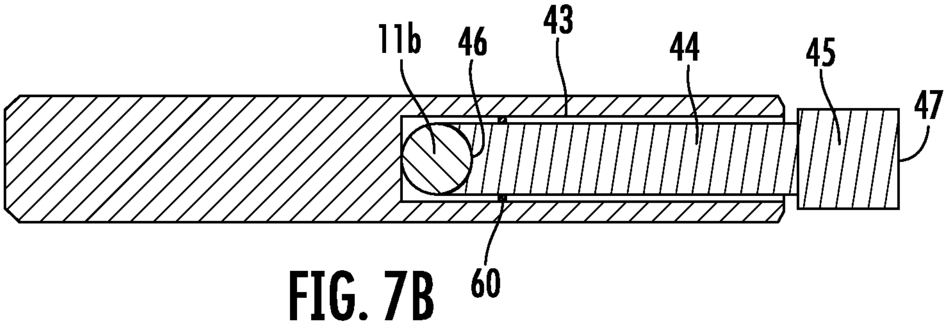
FIG. 7B illustrates a cross-sectional view of the screw assembly of FIG. 7A along line 7B-7B, in accordance with aspects of this disclosure.

As shown in FIGS. 4 and 7A-7B, the pusher screw assembly 11 may comprise of a screw 11*a*, ball bearing pivot 11*b*, and a pusher pin 11*c*. Screw 11*a* preferably includes a threaded shaft section 41 and an unthreaded section 42 including a hexagonal shaped head where the hexagonal head is sized and configured to fit a wrench, a pneumatic impact wrench, or other drive tool. The threaded section of screw 11*a* has a first end opposite the hexagon head where the first end may include an axial bore 43. The axial bore 43 may also contain an internal gland or groove for an o-ring seal 60 to provide a frictional fit against the outer surface of the pusher pin 11*c* to provide retention of ball bearing pivot 11*b* and pusher pin 11*c* within the screw 11*a*. The threaded section of screw 11*a* is sized and configured to fit within threaded axial bore 34 of insert 12.

Pusher pin 11*c* includes a first section 44 which is preferably a cylindrical shaft having a first diameter and a second cylindrical section 45 having a second diameter. The first section 44 having a first diameter that is sized and configured to fit and be at least partially received within the axial bore 43 of at a first end of screw 11*a*. The second diameter is preferably greater than the first diameter. The first section 44 may include a first end face 46 which is preferably concave and sized and configured to match the radius of ball bearing pivot 11*b*. The first section 44 includes a reduced diameter portion towards the first end face 46 which facilitates breaking of the seal imparted by the o-ring seal 60 to allow air to escape from the cavity. The second section 45 includes a second end face 47 which is preferably a planar surface.

With respect to the use of the hub remover tool 1, the hub remover plate 10 is attached or affixed to the hub assembly 16 by positioning at least one lug 14 through elongated slot 19. Preferably, washers 13, shown in FIGS. 1, 5A-5B, and 6A-6B, are used with the nuts 15 that mount onto the lug 14 to hold the hub remover plate 10 securely to the hub assembly 16. In some cases, a second lug 14 may extend through a second elongated slot 19, and then have washers 13 and nuts 15 attached to further secure the hub remover plate 10 to the hub assembly 16. After the hub remover plate 10 has been attached to the hub assembly 16, the hub assembly 16 may be rotated to align opening 18 with a fixed member on the suspension arm 17. The first portion 31 of insert 12 may be positioned within opening 18 and adjusted to align its threaded axial bore 34 with a fixed member on the suspension arm 17. Pusher screw assembly 11 is operatively coupled with insert 12 by placing the threaded shaft section of screw 11*a* into the threaded axial bore 34 of insert 12. The pusher screw assembly 11 is positioned such that pusher pin 11*c* is in contact with the fixed member of the suspension arm 17. A drive tool 5 may be attached to the hexagonal head portion of screw 11*a* to rotate the pusher screw assembly 11 and separate the plate 10 and attached hub assembly 16 from the vehicle suspension arm 17.

The hub remover tool 10 described herein enables a user to remove a hub assembly 16 from a suspension arm 17 of a vehicle. It is also understood that the systems, methods, and machines described herein may be constructed with similar structural and functional elements having different configurations, including different ornamental appearances. Still other benefits may be recognized by those skilled in the art. Accordingly, while the specific embodiments have been illustrated and described, numerous modifications come to mind without significantly departing from the spirit of the invention and the scope of protection is only limited by the scope of the accompanying claims.

What is claimed is:

1. A tool for removing a hub assembly from a suspension arm of a vehicle comprising:

a hub remover plate that includes a front surface, a rear surface opposite the front surface, an arcuate section extending between the front surface and the rear surface, wherein the hub remover plate further comprises a slot and an opening extending through the hub remover plate;

an insert comprising a first portion that is configured to be received within the opening of the hub remover plate, a second portion that has a width greater than a shortest dimension of the opening to prevent the insert from passing through the opening during use of the tool, and a threaded axial bore extending through the insert; and a pusher screw assembly that includes a screw, wherein the screw is configured to be received in the threaded axial bore of the insert.

2. The tool of claim 1, wherein the slot of the hub remover plate comprises two slots.

3. The tool of claim 2, wherein the two slots have a common centerline.

4. The tool of claim 1, wherein the slot has a width and a length, and wherein the width is approximately 30 percent of the length.

5. The tool of claim 1, wherein the opening of the hub remover plate is generally rectangular in shape.

6. The tool of claim 1, wherein a centerline of the opening is aligned with the center of a radius of the arcuate section.

7. The tool of claim 1, wherein the pusher screw assembly further includes a ball bearing pivot and a pusher pin, wherein the ball bearing pivot is received within an axial bore at a first end of the screw.

8. The tool of claim 7, wherein the screw further includes a hexagonal shaped head at a second end of the screw opposite the first end, and wherein the pusher pin includes a first section that is at least partially received within the axial bore at the first end of the screw.

9. The tool of claim 8, wherein a first end of the first section of the pusher pin includes a concave surface, wherein the concave surface has the same radius of the ball bearing pivot.

10. The tool of claim 8, wherein the pusher pin includes a second section opposite the first end that includes a second end face with a planar surface.

11. A method of removing a hub assembly from a suspension arm of a vehicle comprising:

attaching a hub remover plate to the hub assembly by positioning a first lug of the hub assembly through a first slot in the hub remover plate;

attaching a first nut onto the first lug to hold the hub remover plate to the hub assembly;

rotating the hub assembly to align an opening of the hub remover plate with a fixed member of the suspension arm;

inserting a first portion of an insert into the opening;

aligning a threaded axial bore of the insert with position a second portion of the insert with the fixed member of the suspension arm;

coupling a screw assembly to the threaded axial bore of the insert by placing a threaded shaft section of the screw assembly into the axial threaded bore such that the screw assembly is in contact the fixed member of the suspension arm; and attaching a drive tool to the screw assembly to rotate the screw assembly.

12. The method of claim 11, wherein the screw assembly comprises a screw, a ball bearing pivot, and a pusher pin, wherein the ball bearing pivot is received within an axial bore at a first end of the screw.

13. The method of claim 12, wherein the screw further includes a hexagonal shaped head at a second end of the screw opposite the first end, and wherein the pusher pin includes a first section that is at least partially received within the axial bore at the first end of the screw.

14. The method of claim 13, wherein a first end of the first section includes a concave surface, where the concave surface is the same as a radius of the ball bearing pivot.

15. The method of claim 13, wherein the pusher pin includes a second section opposite the first end that includes a second end face with a planar surface.

16. The method of claim 11, further comprising:
positioning a second lug of the hub assembly through a second slot in the hub remover plate; and
attaching a second nut onto the second lug.

17. A tool for removing a hub assembly from a suspension arm of a vehicle comprising:
a hub remover plate that includes a front surface, a rear surface opposite the front surface, an arcuate section extending between the front surface and the rear surface, wherein the hub remover plate further comprises a first elongated slot, a second elongated slot, and an opening that extend through the hub remover plate; wherein the first elongated slot and the second elongated slot are aligned on the same centerline;
an insert comprising a first portion that is configured to be received within the opening of the hub remover plate, a second portion has a width greater than a shortest dimension of the opening to prevent the insert from passing through the opening during use of the tool, and a threaded axial bore extending through the insert; and
a pusher screw assembly that includes a screw, wherein the screw is configured to be received in the threaded axial bore of the insert.

18. The tool of claim 17, wherein the opening of the hub remover plate is generally rectangular in shape.

19. The tool of claim 17, wherein a centerline of the opening is aligned with the center of a radius of the arcuate section.

20. The tool of claim 17, wherein the pusher screw assembly further includes a ball bearing pivot and a pusher pin, wherein the ball bearing pivot is received within an axial bore at a first end of the screw.

* * * * *